Nov. 20, 1962 H. D. ALDREDGE 3,064,835
TRUCK BODY
Filed April 13, 1959 3 Sheets-Sheet 1
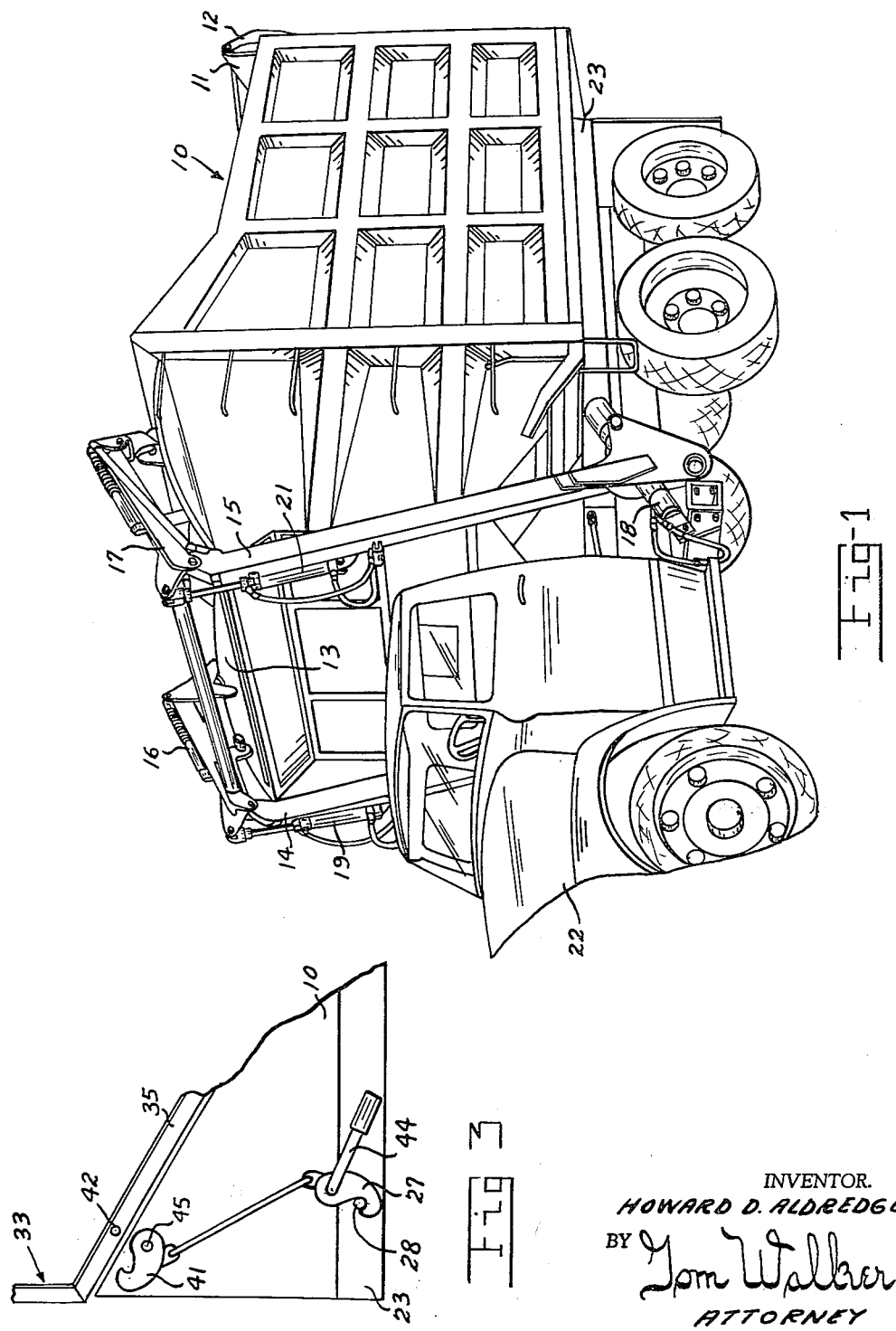
INVENTOR.
HOWARD D. ALDREDGE
BY Tom Walker
ATTORNEY Nov. 20, 1962  H. D. ALDREDGE  3,064,835
TRUCK BODY
Filed April 13, 1959  3 Sheets-Sheet 2
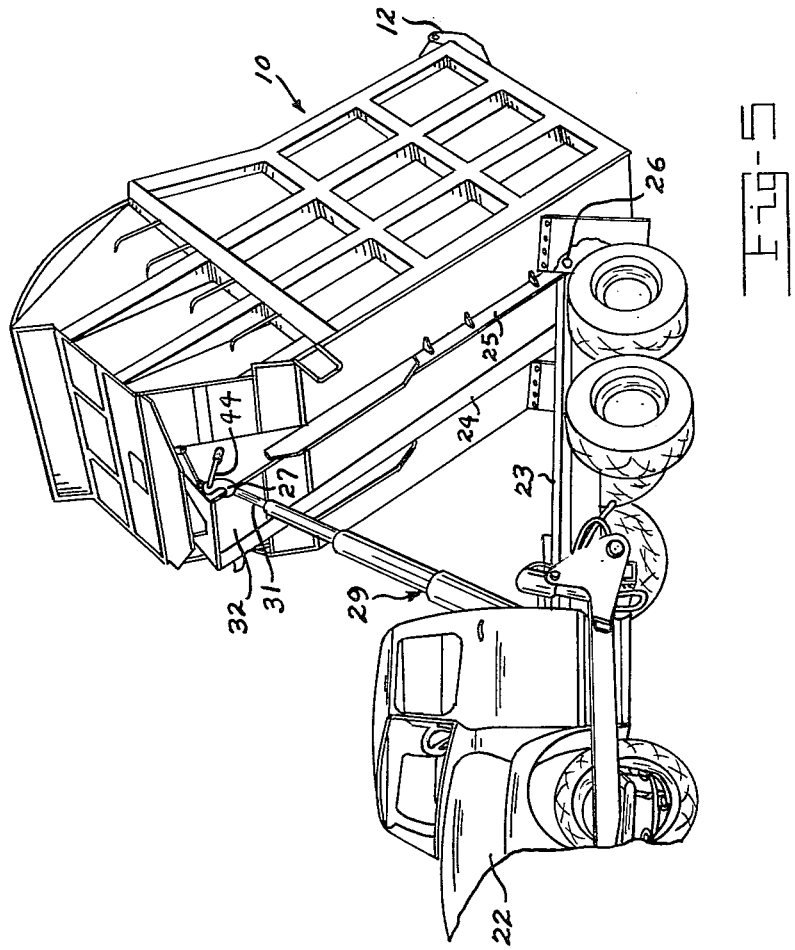
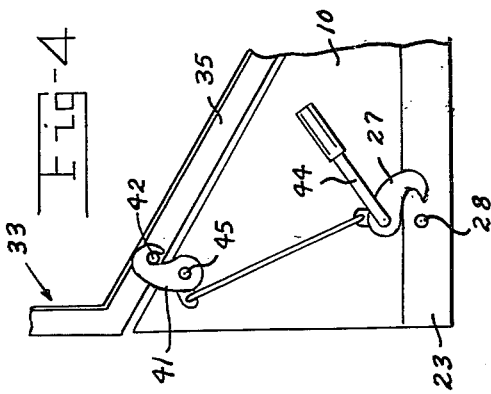
INVENTOR.
HOWARD D. ALDREDGE
BY Tom Walker
ATTORNEY Nov. 20, 1962 H. D. ALDREDGE 3,064,835
TRUCK BODY
Filed April 13, 1959 3 Sheets-Sheet 3
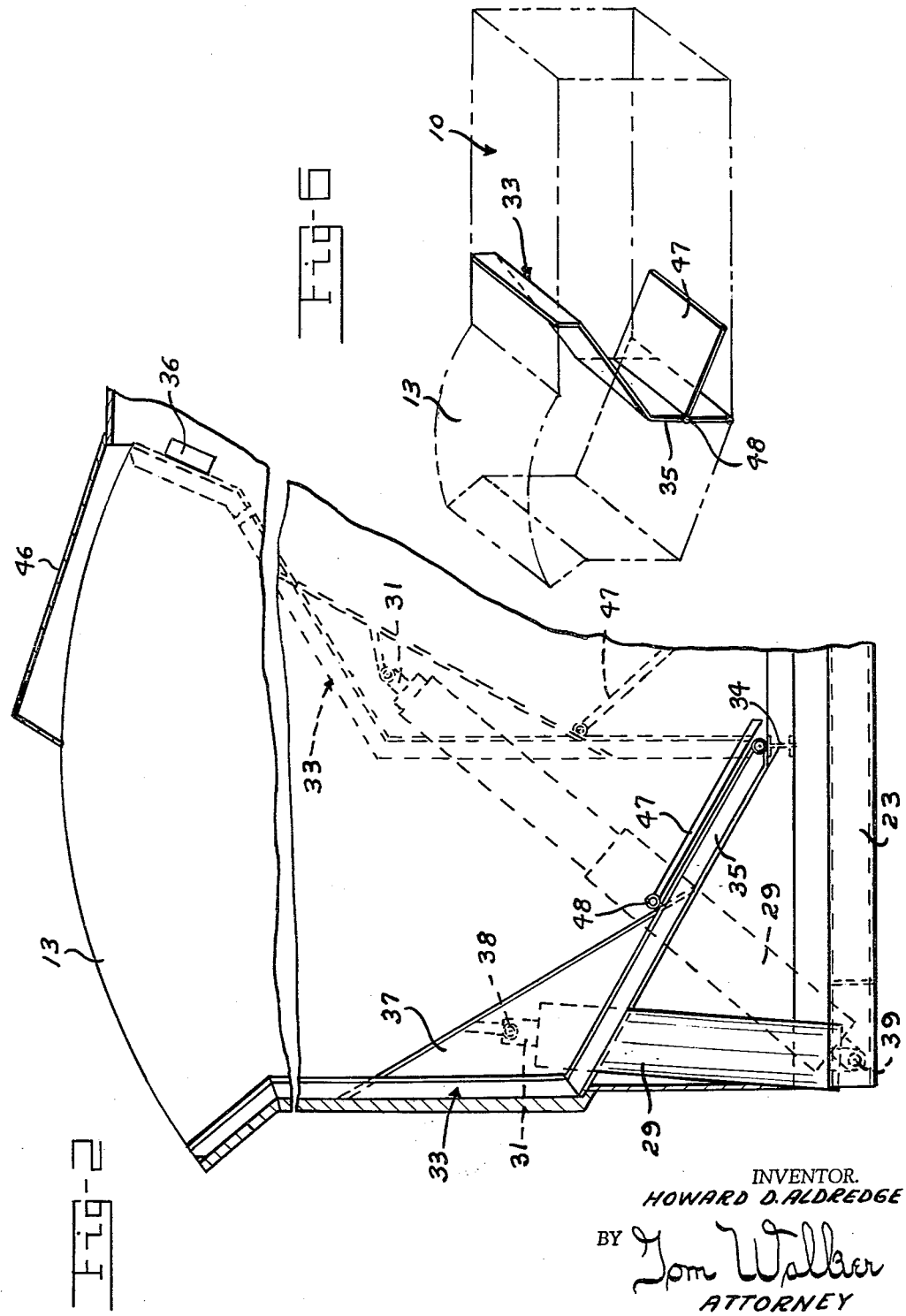
INVENTOR.
HOWARD D. ALDREDGE
BY Tom Walker
ATTORNEY 3,064,835
TRUCK BODY
Howard D. Aldredge, Dayton, Ohio, assignor to Container Service Company, Inc., Dayton, Ohio, a corporation of Ohio
Filed Apr. 13, 1959, Ser. No. 805,851
13 Claims. (Cl. 214—82)

This invention relates to truck bodies, and particularly to truck bodies constructed and arranged for refuse collection and dumping.

The object of the invention is to simplify the construction as well as the means and mode of operation of packer type truck bodies, whereby such bodies may not only be economically manufactured, but will be more efficient and satisfactory in use, adaptable to a wide variety of applications, and be unlikely to get out of order.

An object of the invention is to provide a truck body as described in which a concept of mechanized packing is adapted for use in a front loading truck.

Another object of the invention is to achieve a powered operation of packing and dumping mechanisms in a truck body as described.

A further object of the invention is to operate packing and dumping mechanisms from a single power source in accordance with a concept of alternative use of such power to achieve packing of the truck or dumping therof.

Still another object of the invention is to provide a simple manual control for selection of the packing and dumping functions of the truck body from a single power source.

A further object of the invention is to provide a packer type truck body possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a view in perspective of a refuse collecting truck incorporating a truck body in accordance with the illustrated embodiment of the invention.

FIG. 2 is a fragmentary view of the truck body, showing the packer blade and the means for operation thereof.

FIG. 3 is a detail view of a latch arrangement utilized in the selection of the packing and dumping functions as set out.

FIG. 4 is a view like FIG. 3 showing an alternate position of adjustment of the latch arrangement.

FIG. 5 is a view similar to FIG. 1 at a reduced scale, showing the truck in a dumping position; and FIG. 6 is a view in perspective of the packing blade in activated position, the truck body being shown in dot-dash position.

Like parts are indicated by similar characters of reference throughout the several views.

Referring to the drawings, a truck body in accordance with an illustrated embodiment of the invention comprises a substantially enclosed body 10. At the back thereof is a gate type closure 11 hinged at its upper end to brackets 12 (one shown) in a manner to rock to an open position when the truck body is tilted for dumping, as by being adjusted from the position shown in FIG. 1 to the position shown in FIG. 5. Suitable locking means are provided normally to hold the gate 11 closed.

The instant truck body is adapted for use with a front loading mechanism and has an entrance opening 13 which extends transversely across the front of the body 10 at the upper end thereof. In the loading of the body, which is a mechanized power operation, a pair of arms 14 and 15 are used, these projecting forwardly of the truck body and carrying extensions 16 and 17 respectively which are equipped to make an inter-engaging contact with an open bin or container. The arms 14 and 15 are adapted to be raised and lowered by means including a hydraulic cylinder 18. The extensions 16 and 17 are selectively rocked relatively to the arms 14 and 15 by means including respective hydraulic cylinders 19 and 21.

The truck body 10 is a part of an integrated truck assembly, which further includes the engine and cab unit 22 and a rearwardly extending bed portion or frame 23 on which the body 10 is supported. In the use of the truck, it is directed toward a container, suitably placed for accessibility, and under control of the driver-operator the arm extensions 16 and 17 achieve a cooperative relation with complementary portions on the container. When this is done, the arms 14 and 15 are raised and carry with them the container, elevating it in an arcuate motion which brings the container upwardly and rearwardly over the cab unit 22 to a position substantially overlying the entrance opening 13 of the truck body. At this point, a further automatic or operator initiated control effects a further and independent rocking of the arm extensions 16 and 17. The effect of this is to invert the container while it overlies and is partly received within the entrance opening 13, the result being to empty the contents of the container into the body 10. In a reverse sequence of operations, the empty container is returned to the ground.

On the underside of the body 10 is a pair of longitudinally extending rails 24 and 25 (FIG. 5) pivotally connected, as by a pivot rod 26 to the bed frame 23, the location of such connection being to the rear of the body. At the front thereof a releasable connection between the body and the bed frame 23 is provided in the form of a latch 27 mounted for pivotal movement on the lower front end of the body and adapted to engage a stud 28 set in the side of the bed frame 23. When engaged, as indicated in FIG. 3, the body 10 is locked to the frame of the truck. When disengaged, the body is released for tilting or elevating movement about the pivot 26 toward a position as indicated in FIG. 5.

The means to tilt the truck body comprise a telescopic cylinder 29 from which projects a piston rod 31. The cylinder 29 is based on the bed frame 23 and extends upward toward cooperative relation with the lower front end of the truck body, the projecting piston rod 31 extending into the body 10 through an access opening 32 therein. Within the truck body, in the front thereof, is a packing blade 33. The blade 33 extends generally upright in the truck body and is pivotally connected at its lower end to a transverse beam 34. Extending upwardly in the body, the blade has a shape corresponding to the configuration of the body front wall and normally occupies a leftward position as shown in FIG. 2 wherein the blade abuts or lies in contact with such wall. The beam 34 is spaced longitudinally from the front wall of the body so that the blade presents an inclining portion 35 in generally underlying relation to the entrance opening 13 at the top of the body. Refuse material entering the opening 13 accordingly drops on the blade or in a position between the blade and the main interior of the body. As a result, a rocking motion of the packing blade about the beam 34 from the full line position of FIG. 2 to the dotted line position thereof forces the refuse material rearwardly into the body, compacting it in the manner of devices of this general class for increased capacity loading. A transverse bar 36 in the body provides a stop positively limiting motion of the blade in a rearward or packing direction.

The packing blade is formed with an indented rib 37 providing on the underside of the blade a recess receiving the piston rod 31, and, in the collapsed or telescoped position of the cylinder 29, the upper end of such cylinder. The rod 31 is connected, as by a transverse pin 38, to the indented portion 37 of the packing blade. The cylinder 29 is connected at its lower end or section to pivot means 39 in the bed frame 23. Hydraulic fluid under pressure is supplied in a suitable manner to the cylinder 29 to effect extension of the rod 31 and of the several cylinder sections. Normally this movement is initially effective to rock the blade 33 in the described manner rearwardly in the machine from the full line position of FIG. 2 to the dotted line position thereof, packing introduced refuse into the rear of the body. The extending motion of the hydraulic piston-cylinder mechanism is interrupted by contact of the blade 33 with the stop 36 whereupon the blade is allowed to retract or to return to its starting position by gravity following release of the applied hydraulic pressure or by application of the hydraulic pressure in the opposite sense through adjustment of a four-way valve control.

Selectively, however, the packing blade may be latched to a retracted position in which case the thrust of the piston rod 31 is resolved in a motion to lift or to tilt the entire body about its rear pivot 26. Latching means for this purpose is provided in the form of a latch member 41 (FIG. 3) pivotally mounted on the body 10 and engageable with a laterally extending stud 42 carried by the blade 33. The latch is a part of a latch arrangement further including an interconnecting link 43 and a manually operable lever 44. Thus, the lever 44 is made fast to the latch 27 in such manner that an oscillatory movement of the lever results in a similar motion of the latch 27 to and from an engaged position with respect to the stud 28 on frame 23. The link or rod 43 interconnects ears on the respective latches 27 and 41 in a manner to effect movements of the latch 41 in correspondence with movements of the latch 27. The latches are reversely arranged so that an engaged position of one thereof with its respective stud finds the other latch disengaged. Thus, with the parts positioned as shown in Fig. 3, the body 10 is latched to the bed frame 23 while the packing blade 33 is released from its latch 41. With the parts so positioned, therefore, an activating of the hydraulic cylinder 29 and consequent extension of the piston rod 31 effects an operation of the packing blade 33 while the body 10 remains locked to the frame.

Should the lever 44 be moved in a counter-clockwise direction, however, the latch 27 will rock to a position out of engagement with the stud 28 and simultaneously therewith the latch 41 will move to an engaged position relatively to the stud 42 on the blade 33 (FIG. 4). In this position of the parts, therefore, an actuation of the hydraulic cylinder finds the blade 33 locked in a retracted position. Accordingly, and since the body 10 is now released from the bed frame, the applied hydraulic pressure is effective to raise the entire body of the truck about the pivot 26, the motion being continued through the several stages of extension of the hydraulic cylinder sections and of the rod 31 until the parts achieve a dumping position as shown in FIG. 5. Release of the applied pressure enables the body to return to a position or rest on the frame 23 where it may be again latched by operation of the lever 44, this operation simultaneously releasing the packing blade 33 for response to subsequent actuations of the hydraulic cylinder.

The described latch arrangement, operating under control of the lever 44, adapts a single power source as represented by the hydraulic cylinder 29 to a selective operation of the packing blade 33 and of the tiltable body. The lever 44 is presented for easy access at the front of the body on the exterior thereof. The latch arrangement, it will be understood, may include duplicate latches on opposite sides of the body. Thus, there may be a second latch 27 on the other side of the body 10 engaging the same or a similar stud 28 on the frame 23. The latch 41 is mounted on a rod 45 which may extend transversely through the body 10 and have a like latch mounted on the other end thereof engageable with another stud on the blade 33. A link corresponding to the link 43 would then interconnect the latches on the opposite side of the body for simultaneous operation in accompaniment with movement of the lever 44.

The movement of the packing blade 33 toward the rear of the body is such as to bring it well within the overhang of an extension 46 of the roof of the body 10. Accordingly, when the packing blade is in an actuated position of engagement with the bar 36, the entrance opening 13 of the body is substantially closed from communication with the main interior. When the truck is running or standing idle, therefore, the truck body can be effectively closed in the interests of sanitation. The location of the entrance opening 13, the concept of front end loading and the arrangement of the packing blade to pack the introduced material rearwardly in the body all cooperate, it further may be seen, in a simplified handling of refuse material providing not only for a more speedy and efficient loading of the refuse material but also in making possible quick and easy discharge of a truck load by conventional dumping procedures.

Further in accordance with the illustrated embodiment of the invention the packing blade 33 is a part of a blade assembly further comprising an auxiliary or scraper blade 47. As seen particularly in FIG. 6, the blade 47 is generally rectangular in shape. Its width corresponds approximately to the width of the blade 33. One of the longer edges thereof is pivotally connected at 48 to the portion 35 of blade 33 on what may be considered the back thereof since it faces the back of the truck body. The scraper blade is dependent from the main blade 33 and the length thereof, together with the location of pivot point 48 is such as to place the opposite one of the longer edges in projecting relation to the point of connection of blade 33 with beam 34. In a retracted position of the blade assembly, as shown in full lines in FIG. 2, the scraper blade 47 lies at rest in generally superposed contacting relation to blade portion 35. As the packing blade moves rearwardly, under actuation of the hydraulic cylinder 29, the free relatively projecting end of the scraper blade engages the bottom of the truck body. Continued, rearward motion of the packing blade has the effect of driving the scraper blade rearwardly with the free end thereof in scraping contact with the bottom of the body. The scraper blade assumes, in response to such action, an angular position relatively to the packing blade wherein the upper or outer surface thereof acts as an inclined wedge. The fully actuated position of the blade assembly finds the parts as illustrated in FIG. 6.

The construction and arrangement of the auxiliary or scraper blade, it will be understood, is such as to have a two fold effect in the packing operation. In scraping the bottom of the body immediately to the rear of the base of blade 33 it obviates the building up of deposits which might limit free movement of the packing blade to fully actuated position. Also, the wedge like shape it assumes in operation imparts an upward as well as rearward component of thrust to the refuse material. The fullest advantage so may be taken of the compacting action of the packing blade, utilizing to a maximum extent the full capacity of the body.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A truck body for refuse collecting, including a bed frame a body thereon pivotally connected at the rear to said frame, a single extensible and retractable means based at its one end on said bed frame and operatively connected at its other end to said body at the front thereof, packing blade means contained in and movable to and fro in said body, and means utilizing motion of said extensible and retractable means alternatively to tilt said body while holding said blade from motion relative thereto and to move said packing blade relative to said body.

2. A truck body for refuse collecting, including a tiltable body having an entrance opening at one end thereof, a packing blade within said body and movable across said opening toward the other end of the body and retractable therefrom, an actuator based outside said body connected to said blade and operable to move said blade, and selectively operable means to latch said blade against motion relatively to the body, operation of said actuator in the latched position of said blade serving to tilt said body.

3. A truck body for refuse collecting, including a tiltable body having an entrance opening at the front thereof and an exit opening at the rear, a bed frame supporting said body and to which said body is pivotally connected at the rear thereof, a packing blade in said body movable to and fro across the entrance opening, extensible and retractable means based on said frame and connected to said blade, and selectively operable means to latch said blade to said body to utilize motion of said extensible and retractable means to tilt said body.

4. A truck body for refuse collecting, including a bed frame, a body thereon and pivotally connected at its one end to said frame, a packing blade movable in said body, a latch arrangement settable to one position holding the other end of said body to said frame while releasing said blade for motion and settable to another position holding said blade against motion relatively to said body while releasing said other end of said body from said frame, and power means effective in accordance with the setting of said latch arrangement to move said packing blade or to tilt said body relatively to said frame about its said one end.

5. A truck body according to claim 4, characterized in that said power means includes a hydraulic cylinder attached to said bed frame and a piston rod extending from said cylinder to a connection with said packing blade.

6. A truck body for refuse collecting, including a bed frame, a body thereon and pivotally connected at its one end to said frame, a packing blade pivotally mounted in the other end of said body, said body having an entrance opening at said other end and a discharge opening at said one end, extensible and retractable power means interposed between said bed frame and said packing blade, and a latch selectively operable to hold said packing blade from motion relatively to said body, extension of said extensible and retractable power means in an engaged position of said latch serving to tilt said body on said frame about said one end.

7. A truck body according to claim 6, characterized by another latch settable to hold said other end of said body to said frame and a connection between said latches whereby in an engaged position of the first said latch said other latch is disengaged and in a disengaged position of the first said latch the said other latch is engaged.

8. A truck body for refuse collecting, including a bed frame, a substantially enclosed body supported on said frame and pivotally connected to one end to said frame, said one end of said body having a discharge opening, the other end of said body having an entrance opening in the upper part thereof, a packing blade pivotally mounted in said body to swing across said entrance opening toward the said one end of the body and to return therefrom, a stop to limit motion of said blade toward said one end of the body, said blade when limiting against said stop closing said entrance opening from communication with the main interior of the body, power means, and means selectively to operate said packing blade and to tilt said body from said power means.

9. A truck body for refuse collecting, including a bed frame, a substantially enclosed body supported on said frame and pivotally connected at one end to said frame, said one end of said body having a discharge opening, the other end of said body having an entrance opening in the upper part thereof, a packing blade pivotally mounted in said body to swing across said entrance opening toward the said one end of the body and to return therefrom, a stop to limit motion of said blade toward said one end of the body, said blade when limiting against said stop closing said entrance opening from communication with the main interior of the body, a hydraulic cylinder mounted on said bed frame, a piston extensible from said cylinder into said body and connected to said packing blade, extension of said piston moving said blade toward said one end of the body, and a latch settable to hold said blade from such movement, extension of said piston when said latch is engaged serving to tilt said body about said one end.

10. A truck body for refuse collecting, including a bed frame, a substantially enclosed body supported on said frame and having front and back ends, the latter being adapted for discharge of contained material, said body having at its front end in the upper portion thereof an entrance opening, a packing blade arranged transversely within said body in generally underlying relation to said entrance opening, a pivot for said packing blade in the bottom of the body longitudinally spaced from the front end thereof, said blade having a retracted position in which it abuts the said front end of the body and being movable toward the rear of the body in an actuating motion carrying it across said entrance opening, a transverse stop defining a limit of actuating motion of said blade, and hydraulic actuating means including a cylinder attached outside said body to said bed frame and extending into said body at the front end thereof, said hydraulic means further comprising a piston rod extensible from said cylinder and connected to said packing blade.

11. A truck body for refuse collecting, including a bed frame, a substantially enclosed body on said frame, a packing blade transversely disposed in said body near one end for oscillatory motion, said blade being pivotally movable about an axis within the body, means to introduce refuse material into said body, motion of said blade in one direction serving to compact introduced material toward the other end of the body, and an auxiliary blade hinged to said packing blade for scraping the bottom of the body during motion of said packing blade in said one direction, said auxiliary blade being hinged to said packing blade intermediate the ends thereof and resting on said packing blade in approximately parallel overlapping relation thereto when said packing blade is disposed at said one end of the body, motion of said packing blade in said one direction effecting an angular adjustment of said blade while it engages and scrapes the bottom of the body.

12. A truck unit for refuse collecting including a substantially enclosed body, a packing element disposed within and transversely of said body to one end, said packing element being pivotally movable about an axis within the body, said body having an opening therein for introducing refuse material in advance of said packing element, means for moving said packing element arcuately within said body to advance the refuse material from said one end of said body toward the other for compaction thereof and an auxiliary scraper unit operatively connected to said packer element intermediate upper and lower ends of said packer element for advancement relative thereto on movement thereof to scrape refuse from the bottom of said body and thereby prevent interference with the compaction of the refuse material by the packer element, said scraper unit assuming a plurality of positions relative to the packing blade in the operation of said blade.

13. A truck body for refuse collecting, including a bed frame, a substantially enclosed body on said frame, a packing blade transversely disposed in said body near one end for oscillatory motion, said blade being pivotally movable about an axis within the body, means to introduce refuse material into said body, motion of said blade in one direction serving to compact introduced material toward the other end of the body, and an auxiliary blade hinged to said packing blade for scraping the bottom of the body during motion of said packing blade in said one direction, said auxiliary blade assuming a plurality of positions relative to the packing blade in the operation of said packing blade, said auxiliary blade having its one end pivotally connected to said packing blade intermediate the ends thereof and having its other end in free relative projecting relation to said packing blade, motion of said packing blade in said one direction effecting an angular adjustment of said auxiliary blade while it scrapes the bottom of the body, whereby said auxiliary blade presents a wedge shape to impart an upward component of thrust to a contained refuse material.

References Cited in the file of this patent

UNITED STATES PATENTS

| | | |
|---|---|---|
| 2,561,608 | Boissonnault | July 24, 1951 |
| 2,750,055 | Huffines | June 12, 1956 |
| 2,750,056 | Dow | June 12, 1956 |
| 2,793,769 | Weber | May 28, 1957 |
| 2,889,944 | Clark et al. | June 9, 1959 |

FOREIGN PATENTS

| | | |
|---|---|---|
| 44,088 | France | July 23, 1934 |

(Addition to No. 757,689)